United States Patent
Huth

(10) Patent No.: US 6,664,690 B2
(45) Date of Patent: Dec. 16, 2003

(54) PERMANENT MAGNET EXCITED ROTOR FOR A PERMANENT MAGNET EXCITED ELECTRIC DRIVE, PARTICULARLY FOR AC MAIN DRIVES

(75) Inventor: Gerhard Huth, Leutershausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/935,858

(22) Filed: Aug. 23, 2001

(65) Prior Publication Data

US 2002/0063486 A1 May 30, 2002

(30) Foreign Application Priority Data

Aug. 23, 2000 (DE) .......................................... 100 41 329

(51) Int. Cl.$^7$ ................................................ H02K 21/12
(52) U.S. Cl. ........................... 310/156.57; 310/156.45; 310/156.31; 310/156.28
(58) Field of Search ................ 310/156.01, 156.83, 310/156.02, 156.23, 156.28, 156.29, 156.31, 156.44, 156.45, 156.55, 156.57, 156.12, 156.13, 156.15, 156.81

(56) References Cited

U.S. PATENT DOCUMENTS

| | | | | |
|---|---|---|---|---|
| 3,914,629 A | * | 10/1975 | Gardiner | 310/156.12 |
| 4,117,360 A | * | 9/1978 | Richter | 310/156.55 |
| 4,190,779 A | * | 2/1980 | Schaeffer | 310/12 |
| 4,429,263 A | * | 1/1984 | Muller | 310/68 R |
| 4,517,483 A | * | 5/1985 | Hucker et al. | 310/156.57 |
| 4,757,220 A | * | 7/1988 | Pouillange | 310/49 R |
| 4,797,602 A | * | 1/1989 | West | 290/46 |
| 4,930,201 A | * | 6/1990 | Brown | 29/447 |
| 5,170,083 A | * | 12/1992 | Burgbacher | 310/156.12 |
| 5,233,250 A | * | 8/1993 | De Filippis | 310/156.45 |
| 5,631,512 A | * | 5/1997 | Kawabata et al. | 310/156.15 |
| 5,642,013 A | * | 6/1997 | Wavre | 310/12 |
| 5,767,601 A | * | 6/1998 | Uchiyama | 310/156.26 |
| 5,828,152 A | * | 10/1998 | Takeda et al. | 310/156.19 |
| 6,029,336 A | * | 2/2000 | Kliman et al. | 29/598 |
| 6,144,130 A | * | 11/2000 | Kawamura | 310/156.22 |

* cited by examiner

*Primary Examiner*—Dang Le
(74) *Attorney, Agent, or Firm*—Henry M. Feiereisen

(57) ABSTRACT

For achieving a constant capacity range by way of field weakening of a permanent magnet excited drive the magnetic transverse resistance (Rm) of the rotor plate pack is increased by pole gaps (P1, P2), which are produced by milling into the upper surface (O) of the rotor plate section (L), or are punched into the rotor plate section (L), whereby a covering of the poles of $T_p$ in the range of from 70% to 80% has been shown to be particularly advantageous.

15 Claims, 2 Drawing Sheets

PERMANENT MAGNET EXCITED ROTOR FOR A PERMANENT MAGNET EXCITED ELECTRIC DRIVE, PARTICULARLY FOR AC MAIN DRIVES

CROSS-REFERENCES TO RELATED APPLICATIONS

This application claims the priority of German Patent Application Ser. No. 100 41 329.3, filed Aug. 23, 2000, the subject matter of which is incorporated herein by reference.

BACKGROUND OF THE INVENTION

The invention relates to a permanent magnet excited rotor for an electric drive having a rotor plate pack and permanent magnets.

Nowadays, machines or devices such as, for example, machine tools are expected, in the range of lower revolutions, to comprise a duty rating which increases in linear manner with the number of revolutions. There is expected of an AC motor, from the rated number of revolutions up to the maximal number of revolutions, a substantially constant duty rating.

AC type main drives are, as a general rule, configured as asynchronous devices which satisfy the first requirement mentioned above up to the rated number of revolutions. The second requirement can also be satisfied, from the rated number of revolutions, with the asynchronous technique in a simple manner, since the air gap flux can be affected, and weakened, in direct manner, by way of the output voltage of a converter.

However, within the range of main drives, the permanent magnet excited AC motor is gaining in importance, primarily due to the fact that such a motor has a higher power density and, associated therewith, it allows a more compact motor configuration.

Problems do arise in the utilization of main drives in the asynchronous technique by permanent magnet excited motors primarily in the realization of the range of constant duty behavior commencing from the level of the rated number of revolutions. To satisfy this requirement is much more difficult in the case of a permanent magnet excited motor and it requires a greater economical effort.

The effectiveness of the field weakening of permanently excited or permanent magnet excited main drives is largely a function of the design of the plate section of the rotor, whereby the following requirements are to be satisfied for the inductivities in the longitudinal axis (d) and the transverse axis (q):

$L_q$ as feasible—small $L_d$ as feasible—large $$L_q < L_d \tag{1}$$

SUMMARY OF THE INVENTION

It is an object of the present invention to provide a rotor plate section which satisfies the above-mentioned requirements with respect to technical considerations, and also with respect to considerations of economics.

In accordance with one of the aspects of the present invention this object is achieved by a permanent magnet excited rotor for an electric drive, comprising a rotor plate pack and with permanent magnets, in which the rotor plate section is provided, for the purpose of raising the magnetic transverse resistance for the transverse axis of the rotor, with pole gaps.

In case of greater axis heights, it has been found advantageous in the technical aspect to arrange the magnets at the air gap and not in the rotor plate section, whereby the permanent magnets are disposed on the outer surface of the rotor plate in such a way that these magnets are disposed, during the assembly of the rotor in a stator, at the air gap between the rotor and the stator. Due to this, inter alia, a larger active-part utilization is achieved.

For reasons of utilization and for the purpose of an enhanced upper field behavior, the pole gaps are preferably configured in such a way that a pole coverage of the outer surface of the rotor plate with permanent magnets is in the range of from about 70% to about 80%.

In accordance with a further advantageous embodiment of the invention, the distance of depth of the pole gaps in the rotor plate is greater than the distance of width of the air gap provided between the rotor, mounted in a stator, and the stator.

It is, furthermore, advantageous that the pole gaps are disposed in the rotor plate pack in equidistant manner.

With respect to the manufacturing process, it is advantageous that the pole gaps are directly disposed at the air gap, particularly when they are produced by milling into the upper surface of the rotor plate pack.

Alternatively, the pole gaps can be arranged in the rotor plate section in covered manner, particularly by being stamped or punched into the rotor plate pack.

Furthermore, the pole gaps can be filled with an amagnetic material. This can comprise fill bodies such as, for example, plastic-synthetic rods, or by pouring an amagnetic material into the pole gaps.

The concept of the invention provides the design of a permanent magnet excited electric drive with a stator with a three-phase stator winding with a predetermined pole pair and with a rotor in accordance with the invention, which drive satisfies the above-mentioned requirements of a main drive, whereby such a drive can be operated, by way of field weakening at varying number or rotations, in a range of constant efficiency or capacity or output.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference letters.

Figure 1:
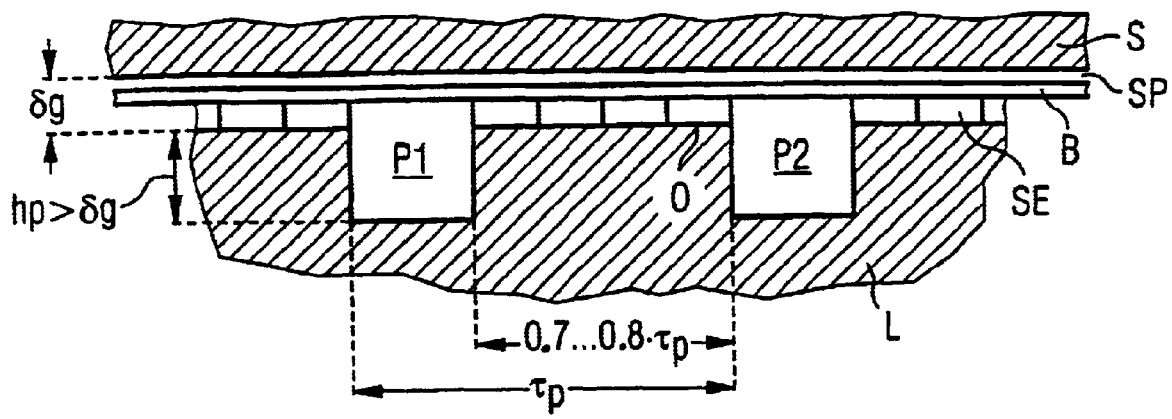
FIG. 1 is a developed view of a rotor in accordance with the invention with the open pole gap directly at the air gap.

In the illustration of FIG. 1, there is shown a portion of a development or lay-out of a rotor (longitudinal section) in accordance with the invention, with open pole gaps P1, P2 directly at the air gap SP. The air gap SP between the stator S and the rotor plate L has the width of $\delta_g$. The pole gaps P1 and P2 are directly provided at the air gap SP, by being milled or punched into the rotor plate pack and they comprise, for example, a rectangular cross-section, whereby the depth $h_p$ of the pole gaps with respect to the width $\delta_g$ of the air gap SP is advantageously dimensioned to be large, according to:

$$h_p > \delta_g \quad (2).$$

So as to satisfy the requirement of the equation (1) mentioned above, in accordance with the invention, the magnetic transverse resistance is to be increased. In the magnetic circle, the magnetic flux is proportionally a function of the magnetic tension and it is limited by the magnetic resistance Rm. The magnetic resistance Rm, in turn, is determined by the material constant of the rotor plate L and the geometric dimensions thereof.

In accordance with the invention, by way of the pole gaps P1, P2, as effect, the magnetic resistance Rm for the transverse axis or, respectively, the q-axis, is increased, whereby, due to reasons of the utilization and the upper field behavior as technical optimum, the pole coverage $\tau_p$ with permanent magnets SE is to be selected to be within the range of from about 70% to about 80%.

In the presentation of FIG. 1, this relationship is expressed thereby that the distance $\tau_p$ between—as a rule being equidistant—the pole gaps P1 and P2 is dimensioned in such a way that approximately the mentioned 70% to 80% of the outer surface of the rotor plate pack L is covered by permanent magnets SE. These are precisely the portions disposed between two pole gaps, that is, the poles as such. For reasons of protection, the entire outer surface or, respectively, the outer surface O of the rotor atop the permanent magnets SE, is covered with an additional binding B.

The arrangement of the permanent magnets SE at the air gap SP is based on the recognition that in case of a larger axis height technical advantages, with respect to a higher active part utilization vis-a-vis to embedding of the SE magnets in the rotor plate section, are existing. However, the invention can also be realized with SE magnets which are embedded in the rotor plate section L.

Figure 2:
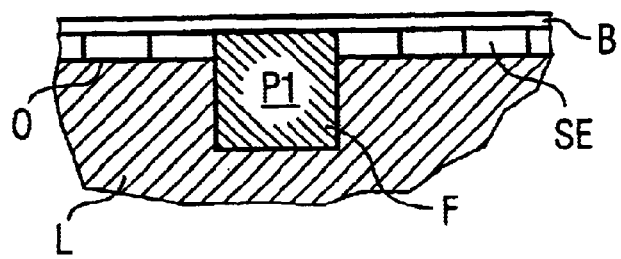
FIG. 2 is a portion of FIG. 1 illustrating a pole gap filled with an amagnetic fill body.

The illustration of FIG. 2 shows a portion of FIG. 1 in the rotor plate section L about the pole gap P1, whereby this is filled with an amagnetic fill body F. The same applies for further pole gaps, not shown, whereby the fill body, for example, is a plastic-synthetic rod that is introduced into the gap, or the pole gap is filled by pouring.

Figure 3:
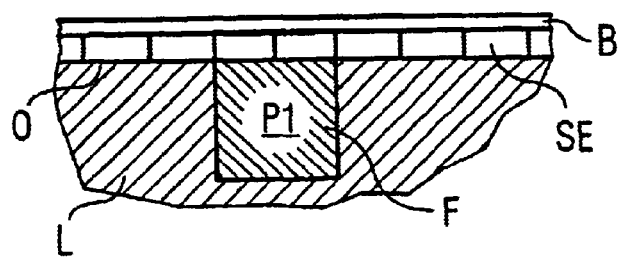
FIG. 3 is a view similar to FIG. 2, but illustrates a different embodiment comprising a substantially continuous arrangement of permanent magnets.

In the illustration according to FIG. 3, the same portion is shown as that in FIG. 2, however the outer surface O of the rotor beneath the binding B is fully furnished or equipped with SE magnets. The aforementioned advantageous relationship of a pole coverage of 70% to 80% is, however, also in this embodiment ensured, since in the pole gap P1 and other pole gaps beneath the superposed SE magnets there is provided air—or as shown in FIG. 3—an amagnetic fill body F. This means that in this region the SE magnets can not develop the same effect as directly atop the poles.

Figure 4:
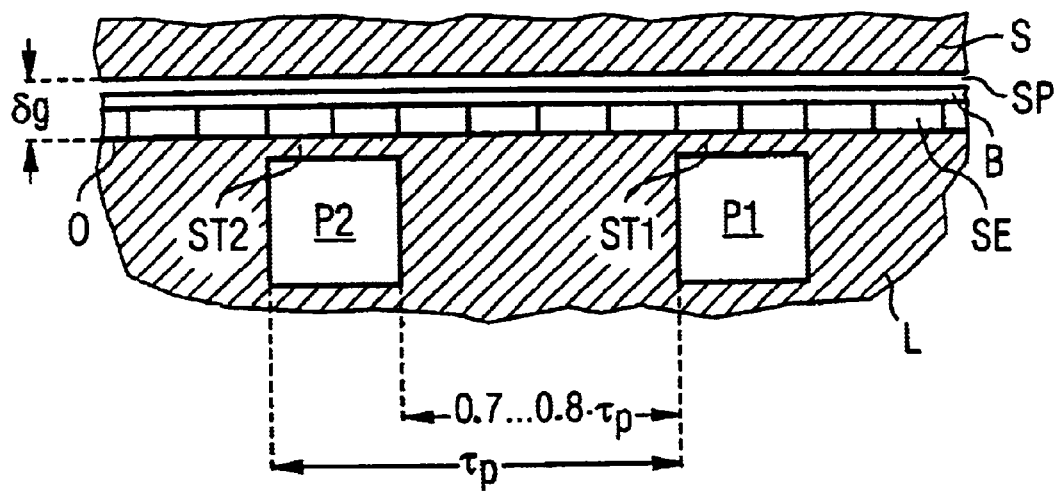
FIG. 4 is a developed view of a rotor in accordance with the invention with a covered pole gap in the rotor plate section.

In an alternate embodiment, as is shown in FIG. 4, the pole gaps P1, P2 are arranged in covered manner in the rotor plate section L. This is achieved, for example, by corresponding punching or stamping of the rotor plate L.

The illustration in accordance with FIG. 4 corresponds largely to that of FIG. 1, however, due to reasons dictated by the design, the outer surface O of the rotor is substantially stable or uniform, since atop of the pole gaps P1, P2 there are provided web portions ST1, ST2 made of rotor plate. In the embodiment shown in FIG. 4, furthermore—as is the case with the embodiment of FIG. 3—the outer surface 0 is fully furnished with SE magnets.

The aforementioned requirement (2) also is applicable to the cross-section of the pole gaps P1, P2 made, for example, by punching.

Figure 5:
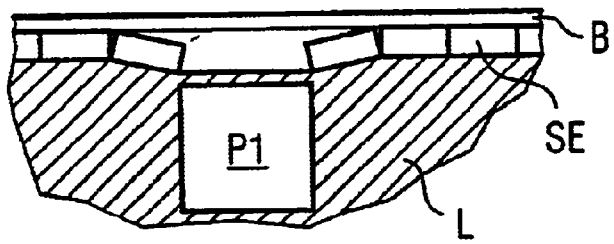
FIG. 5 is a portion of FIG. 4, but illustrating the arrangement in which the pole gap is not furnished with a magnet.

FIG. 5 shows in a portion an embodiment which differs from that shown in FIG. 4 that the regions above the pole gaps are not furnished with SE magnets.

Figure 6:
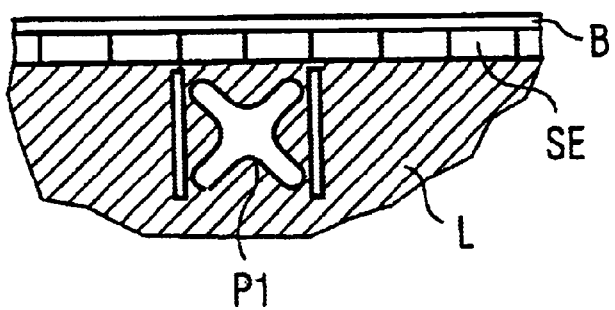
FIG. 6 is a variant of a rotor in accordance with the invention with a covered pole gap.

It will be understood that aside from the shown rectangular-shaped cross-sections of the pole gaps P1, P2, shown in the above-described Figures, FIG. 1 to FIG. 5, also other geometrical shapes are within the scope of the present invention, whereby however, attention needs to be paid thereto that, advantageously, the requirement (2) remains satisfied. FIG. 6 shows a possible alternate cross-section configuration using the example of a punched cross with slots positioned to the left and to the right. Of course, the person with skill in the art will be conversant with many other also useful cross-sectional configurations for forming the pole gaps in accordance with the present invention.

While the invention has been illustrated and described as embodied in a permanent excited rotor for a permanent excited drive, particularly for AC main drives, it is not intended to be limited to the details shown since various modifications and structural changes may be made without departing in any way from the spirit of the present invention.

What is claimed is:

1. A permanent magnet excited rotor for an electric drive and disposed in a stator comprising:

a rotor plate pack composed of a plurality of rotor plate sections and defining a transverse axis, said rotor plate pack having an outer surface spaced from an opposite surface of the stator at formation of an air gap; and a plurality of permanent magnets arranged upon the outer surface of the rotor plate pack;

wherein each of the rotor plate sections of said rotor plate pack has pole gaps to increase a magnetic transverse resistance in a direction of the transverse axis;

wherein the pole gaps have a depth which is greater than a width of the air gap between the rotor and the stator.

2. The permanent magnet excited rotor of claim 1 disposed in a stator at formation of an air gap therebetween, wherein the plurality of permanent magnets is disposed on the outer surface of a rotor plate pack in the area of the air gap between the rotor and the stator.

3. The permanent magnetic excited rotor of claim 2, wherein the pole gaps are disposed such a manner that there is present a pole coverage of the outer surface of rotor plate pack by the plurality of permanent magnets, with a coverage by the plurality of permanent magnets in the range of from 70% to 80%.

4. The permanent magnet excited rotor of claim 2, wherein the pole gaps are directly disposed in the area of the air gap.

5. The permanent magnet excited rotor of claim 1, wherein the pole gaps are disposed in the rotor plate pack in substantially equidistant manner.

6. The permanent magnet excited rotor of claim 5, wherein the pole gaps are provided in the outer surface of the rotor plate pack by at least one process selected from the group consisting of milling, stamping, and punching.

7. The permanent magnet excited rotor of claim 1, wherein the pole gaps are disposed in covered manner in the rotor plate section.

8. The Permanent magnet excited rotor of claim 7, wherein the pole gaps are substantially filled by a material that is substantially amagnetic.

9. The permanent magnet excited rotor of claim 7, wherein the pole gaps are provided in the rotor plate pack by a punching process.

10. The permanent magnet excited rotor of claim 7, and further comprising a binding for securing the permanent magnets in place.

11. The permanent magnet excited rotor of claim 1, wherein the permanent magnets are rare-earth permanent magnets.

12. The permanent magnet excited rotor of claim 1, wherein the depth of the pole gaps is greater than a thickness of the permanent magnets.

13. A permanent magnet excited electric drive, comprising:

a stator including a three-phase stator winding with a predetermined number of pole pairs; and a rotor including a rotor plate pack, which is formed with pole gaps to increase the magnetic transverse resistance in a direction of a transverse axis of the rotor, and has an outer surface spaced from an opposite surface of the stator at formation of an air gap, and a plurality of permanent magnets received peripherally upon the outer surface of the rotor plate pack, wherein the pole gaps have a depth which is greater than a width of the air gap between the rotor and the stator, said rotor including a same number of pole pairs as the stator.

14. The permanent magnet excited electric drive of claim 13, configured for operation at constant power through field weakening at variable rotation speed.

15. The permanent magnet excited rotor of claim 13, wherein the depth of the pole gaps is greater than a thickness of the permanent magnets.

* * * * *